United States Patent
Jiang-Häfner et al.

(10) Patent No.: US 8,779,730 B2
(45) Date of Patent: Jul. 15, 2014

(54) CAPACITOR DISCHARGE IN A CELL BASED VOLTAGE SOURCE CONVERTER

(75) Inventors: Ying Jiang-Häfner, Ludvika (SE); Lars Döfnäs, Ludvika (SE); Roland Siljeström, Grängesberg (SE); Erika Siljeström, legal representative, Skultuna (SE)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 13/813,081

(22) PCT Filed: Jul. 30, 2010

(86) PCT No.: PCT/EP2010/061127
§ 371 (c)(1),
(2), (4) Date: Mar. 27, 2013

(87) PCT Pub. No.: WO2012/013245
PCT Pub. Date: Feb. 2, 2012

(65) Prior Publication Data
US 2013/0200859 A1 Aug. 8, 2013

(51) Int. Cl.
*H02J 7/00* (2006.01)
*H02J 7/14* (2006.01)
*H02M 7/49* (2007.01)

(52) U.S. Cl.
CPC ........................................ *H02M 7/49* (2013.01)
USPC ............................. 320/166; 320/167; 320/140

(58) Field of Classification Search
CPC ............ H02M 7/49; H02M 2001/322; H02M 2007/4835
USPC ......... 320/166, 167, 164, 150, 137, 123, 125, 320/129; 363/131, 41, 35, 148
See application file for complete search history.

(56) References Cited

U.S. PATENT DOCUMENTS 6,016,258 A * 1/2000 Jain et al. ......................... 363/17
6,847,531 B2 * 1/2005 Bixel ............................... 363/71
(Continued)

FOREIGN PATENT DOCUMENTS

DE 10103031 A1 7/2002
DE 102007014597 A1 9/2008
(Continued)

OTHER PUBLICATIONS

Marquardt et al., "Modulares Stromrichterkonzept fur Netzkupplungsanwendungen bei hohen Spannungen," Bauelemente der Leistungselektronik und ihre Anwendungen, Vortrage der ETG-Fachtagung, XP08105719, Apr. 23-24, 2002, pp. 155-161.

*Primary Examiner* — Edward Tso
*Assistant Examiner* — Alexis Boateng
(74) *Attorney, Agent, or Firm* — Birch, Stewart, Kolasch & Birch, LLP

(57) ABSTRACT

A method and a device to discharge cell capacitors in a cell based voltage source converter. Each cell has switching elements in half bridge or full bridge configuration and a capacitor in parallel to the half or full bridge. Each cell has two terminals, whereof at least one is between two switching elements. The converter has AC and DC terminals, with the possibility to connect each of the terminals to ground, via a further switching element. A resistor is implemented into at least one of the ground connections. To discharge to capacitors, the switching elements in the respective cells are configured such, that the capacitor is in parallel connection to the terminals. The capacitors are thus discharged via the resistor to ground.

26 Claims, 5 Drawing Sheets

(56) References Cited

U.S. PATENT DOCUMENTS

| | | | |
|---|---|---|---|
| 7,564,702 B2* | 7/2009 | Schlecht | 363/21.06 |
| 7,839,023 B2* | 11/2010 | Jacobson et al. | 307/77 |
| 8,199,544 B2* | 6/2012 | Krause et al. | 363/132 |
| 8,344,801 B2* | 1/2013 | Owen et al. | 330/251 |
| 2006/0044849 A1* | 3/2006 | Siljestrom et al. | 363/41 |
| 2006/0256587 A1* | 11/2006 | Asplund et al. | 363/37 |
| 2007/0030713 A1* | 2/2007 | Pietkiewicz et al. | 363/63 |
| 2008/0278117 A1 | 11/2008 | Tarchinski | |

FOREIGN PATENT DOCUMENTS

| | | |
|---|---|---|
| DE | 102008022776 A1 | 1/2009 |
| JP | 2007-312456 A | 11/2007 |
| JP | 2009-247186 A | 10/2009 |

* cited by examiner

CAPACITOR DISCHARGE IN A CELL BASED VOLTAGE SOURCE CONVERTER

FIELD OF INVENTION

The present invention generally relates to cell based voltages source converters. More particularly, the present invention relates to the discharging of the capacitors of the cells in such voltage source converters.

BACKGROUND

Cascaded converter cells, often denoted multilevel converter cells are of interest in many power transmission applications, for instance in High Voltage Direct Current (HVDC) Transmission.

These cells provide discrete voltage levels that can be combined for conversion between AC and DC. Each cell is here made up of an energy storage element, typically a capacitor, being connected in parallel with one or two switching element branches for forming a half or full bridge converter cell. These cells typically have two connection terminals, where a first is provided in the junction between the two switching elements of a first branch and a second, which in the case of a half bridge cell, is placed in the junction between one of the switching elements and the energy storage element and in case of a full bridge cell between the two switching elements of a second branch. The placing of the second terminal in the half-bridge cell defines the cell type, where it may be placed at the junction between one of the switching elements and the energy storage element. The placing of the second terminal at a first such junction therefore defines a first type of half-bridge cell, while the placing of the second connection terminal at a second junction defines a second type of cell.

Half-bridge cell based voltage source converters are generally described in DE 10103031.

In the case of disconnecting a converter for repair and/or maintenance or for protective purposes, the cell capacitors have to be discharged. This discharge should be fast and also safe, in order to guarantee the safety of personnel performing the repair/maintenance.

Such cell capacitor discharge is for instance described in JP 2009-247186, which document shows an inverter including cells with capacitors as well as discharge resistors. This document thus describes that each cell has its own discharge resistor, which is placed in parallel with the capacitor. The problem with this is type of discharging is that there will be some losses also in normal operation, which is disadvantageous, especially if power is to be transmitted over long distances, where a high efficiency is needed. The discharging may also be slow.

JP 2007-312456 discloses a discharge arrangement for another type of voltage source converter. However, the converter is not cell based. JP 2007-312456 discloses a power converter where there are a number semiconductor devices and one intermediate capacitor in parallel with all semiconductor devices. There is also one discharge resistor in parallel with each semiconductor device. Since also this document describes the use of resistors in parallel with the switching elements of the converter, there are also in this case unnecessary losses.

In view of what has been described above there is therefore a need of enabling discharge of the cell capacitors in a cell based voltage source converter that minimizes the losses in normal operation.

SUMMARY OF THE INVENTION

One object of the present invention is to provide fast discharge of the capacitors in a cell based voltage source converter without giving rise to losses during normal operation of the voltage source converter.

This object is according to a first aspect of the present invention achieved through a method of discharging cell capacitors of a cell based voltage source converter having a set of AC terminals and a set of DC terminals, where the AC terminals each have a selectable AC connection to ground and each DC terminal has a corresponding selectable DC connection to ground, the cells are connected in cascade in a set of parallel phase legs between the DC terminals, an AC terminal is provided at the midpoint of a phase leg and each cell has at least one branch with series connected switching elements in parallel with a capacitor, the method comprising the steps of:

connecting the AC terminals to the corresponding AC connections to ground, connecting a first DC terminal to a first DC connection to ground, where either each AC connection to ground or the first DC connection to ground includes a resistor for forming a first capacitor discharging circuit, switching on, in all cells of a first phase leg connected in a formed capacitor discharging circuit, the switching elements of each cell that causes the corresponding cell capacitor to be connected in series between the AC and DC terminals in the discharging circuit for discharging the cell capacitors in the first phase leg in the formed capacitor discharging circuit, and sequentially repeating the step of switching for the cells of the other phase legs until all cell capacitors in the formed capacitor discharging circuit have been discharged, wherein the cells of a phase leg in a formed capacitor discharging circuit are grouped into at least one group and the step of switching on comprises simultaneously switching on all the cells of a group.

This object is according to a second aspect of the present invention also achieved through an interface arrangement for coupling between an AC system and a DC system and comprising a cell based voltage source converter for conversion between AC and DC, the converter having a set of AC terminals and a set of DC terminals, a number of cells connected in cascade in a set of parallel phase legs between the DC terminals, where an AC terminal is provided at the midpoint of a phase leg and each cell has at least one branch with series connected switching elements in parallel with a capacitor, wherein the AC terminals each have a selectable AC connection to ground and each DC terminal has a corresponding selectable connection to ground, and a control unit configured to connect the AC terminals to the corresponding AC connections leading to ground, connect a first DC terminal to a first DC connection leading to ground, where either each AC connection to ground or the first DC connection to ground includes a resistor for forming a first capacitor discharging circuit, and switch on, in all cells of a first phase leg connected in a formed capacitor discharging circuit, the switching elements of each cell that causes the corresponding cell capacitor to be connected in series between the AC and DC terminals in the discharging circuit for discharging the cell capacitors in the first phase leg in the formed capacitor discharging circuit, and sequentially repeat switching on for the cells of the other phase legs until all cell capacitors in the formed capacitor discharging circuit have been discharged, wherein the cells of a phase leg in a formed capacitor discharging circuit are grouped into at least one group and the step of switching on comprises simultaneously switching on all the cells of a group.

The present invention has a number of advantages. The invention provides a fast discharge of cell capacitors, in one example faster than one second. The elements used for providing connections to ground are in many cases used for other purposes in relation to a voltage source converter, why the discharging of cell capacitors according to the invention is performed at small or limited extra costs. The invention is therefore very economical. As the invention proposes the use of resistors in selectable connections to ground, these resistors do not need to be connected to the converter in operation. Therefore, this way of discharging does not cause any additional losses in the operation of the converter.

BRIEF DESCRIPTION OF THE DRAWINGS

The present invention will in the following be described with reference being made to the accompanying drawings, where FIG. 1 schematically shows a single line diagram of an interface arrangement according to a first embodiment of the invention arranged between an AC system and a DC system, FIG. 2 schematically shows a cell based voltage source converter, FIG. 3 schematically shows the structure of a first type of cell, FIG. 4 schematically shows the structure of a second type of cell, FIG. 5 schematically shows the structure of a third type of cell.

DETAILED DESCRIPTION OF THE INVENTION

In the following, a detailed description of preferred embodiments of a device and a method according to the present invention will be given.

The present invention is directed towards providing an arrangement for interfacing a Direct Current (DC) system with an Alternating Current (AC) system, which systems may both be power transmission systems. The DC system can for instance be a High Voltage Direct Current (HVDC) power transmission system and the AC system may be a Flexible Alternating Current Transmission System (FACTS). However, these types of systems are mere examples of such systems and should not be considered as a requirement. The invention can also, for instance, be applied in relation to DC back-to-back systems and to power distribution systems.

Figure 1:
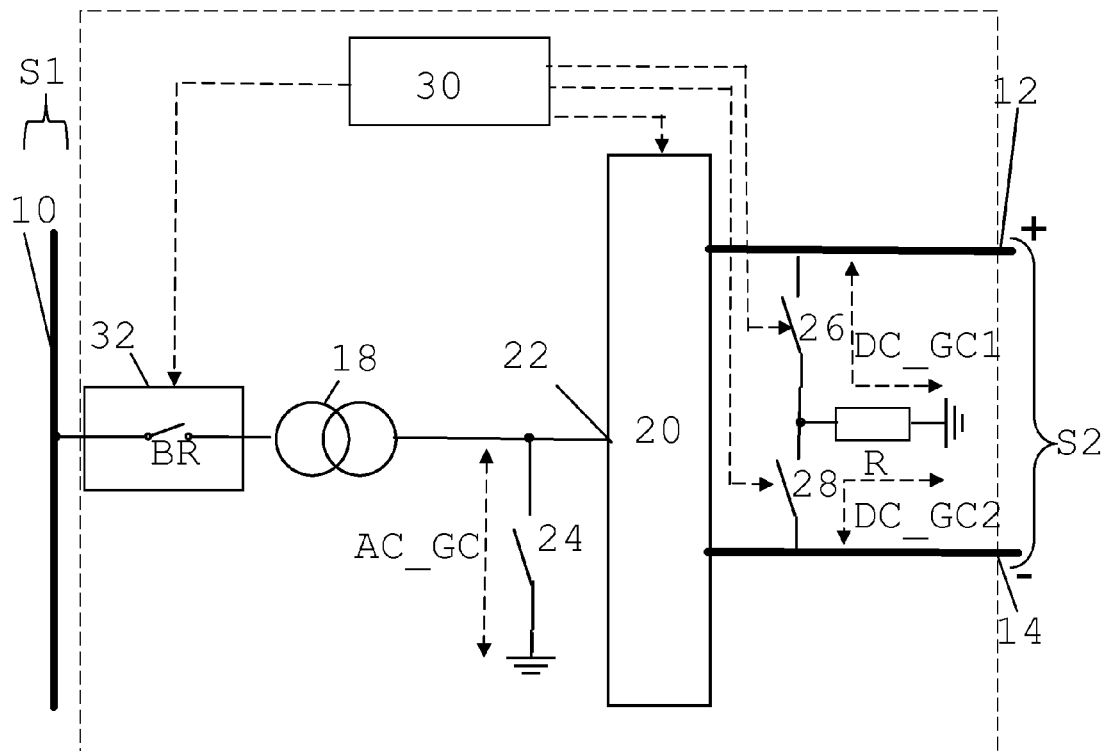

FIG. 1 schematically shows a single line diagram of an interface arrangement 16 according to a first embodiment of the invention for connection between an AC system S1 and a DC system S2. The AC system S1 is in this embodiment a three-phase AC system and normally includes three conductors. In the figure only one conductor 10 is shown. The DC system S2 in turn includes two poles that are coupled to the AC system via the arrangement 16. As there are two poles in this embodiment the DC system is a bipole system. It should however be realized that the invention can also be used with a monopole system. It should here furthermore be realized that both the DC and AC system could include a lot more elements than the poles and conductors shown. However, these are not central for the understanding of the present invention and have therefore been omitted.

In order to enable the DC system S2 to be coupled to the AC system S1 the arrangement 16 includes a converter 20 for conversion between AC and DC. The converter 20 may function as a rectifier and/or inverter. The converter 16 is a cell based voltage source converter and can include a number of different types of cell configurations, of which some will be described later on.

The converter 20 therefore has a DC side for connection to the DC system S2 and more particularly to at least one pole of the DC system and an AC side for being coupled to the AC system. On the AC side the converter 20 therefore has a number of AC terminals, one for each phase as well as a number of DC terminals 12 and 14, one for each pole, where a first DC terminal 12 is connected to a first pole and a second DC terminal 14 is connected to a second pole. Since the figure is a single line diagram only one AC terminal 22 is shown together with the two DC terminals 12 and 14.

The arrangement 16 also includes a transformer 18 having a primary side with a primary winding for being coupled to the AC system S1 and a secondary side with a secondary winding coupled to the AC side of the converter. The secondary windings may more particularly be connected to an AC filter busbar interconnecting the transformer 18 and converter 20. This means that also the AC terminal 22 of the converter 20 would be connected to this busbar. It should here be realized that in some variations of the invention the transformer may be omitted.

According to the invention the interface arrangement 16 is provided with a selectable AC connection to ground AC_GC, There is one such connection provided for each phase. One AC connection leading to ground is thus provided for each AC terminal of the converter. Since FIG. 1 is a single line diagram, only one AC connection to ground AC_GC is shown. This AC connection to ground AC_GC also includes an AC ground switch 24. According to the invention each pole also includes a selectable DC connection to ground, i.e. a connection leading from a corresponding DC terminal to ground. There is thus here a first DC connection to ground DC_GC1 and a second DC connection to ground DC_GC2, where the first goes from the first pole to ground and the other goes from the second pole to ground. In this first embodiment of the invention the first DC connection to ground includes a first DC ground switch 26 in series with a common discharge resistor R, while the second DC connection to ground includes a second DC ground switch 28 also in series with the common discharge resistor R. The discharge resistor R is thus common to both DC connections to ground DC_GC1 and DC_GC2. All the ground switches are open in normal operation of the converter. The DC connections to ground are in this first embodiment provided through DC pole earth switching branches.

The arrangement 16 furthermore includes a set of circuit breakers, one for each phase. In FIG. 1 there is therefore only shown one circuit breaker 32 having a breaker element BR. This circuit breaker 32 is provided between the AC system S1 and the transformer 18. While such a circuit breaker is normally necessary for disconnecting the converter from the AC system, it is not necessarily a part of the interface arrangement of the invention. It may be provided as a separate entity outside of the interface arrangement.

Finally there is a control unit 30 controlling the circuit breaker 32, the AC ground switch 24 of the AC connection to ground AC_GC, the converter 20, the first DC ground switch 26 of the first DC connection to ground DC_GC1 and the second DC ground switch 28 of the second DC connection to ground DC_GC2.

Figure 2:
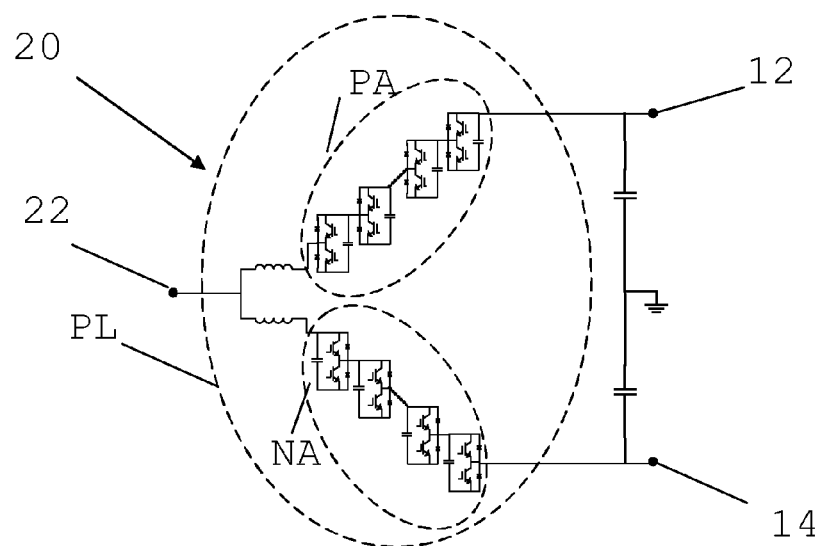

FIG. 2 shows a block schematic outlining an example of the cell based voltage source converter 20 according to a first embodiment of the invention.

The converter includes a number of phase legs, where there is one phase leg for each phase. A converter thus includes at least two, and typically three, phase legs. However, in FIG. 2, only one such phase leg is shown.

As can be seen in FIG. 2, a phase leg PL of this converter includes a number of cells connected in cascade, where each cell includes a capacitor in parallel with at least one branch of switching elements, here two. Each switching element is provided in the form of a transistor with anti-parallel diode. At the midpoint of the phase leg PL the AC terminal 22 is provided. In the converter according to the first embodiment there is furthermore a first and second phase reactor, provided on opposite sides of the AC terminal 22. The phase leg is furthermore divided into two phase arms. There is one phase arm, here denoted a positive phase arm PA, between the AC terminal 22 and the first DC terminal 12 and another phase arm, here denoted negative phase arm NA, between the AC terminal 22 and the second DC terminal 14. A phase arm may thus include half of the cells and one phase reactor. In parallel with the phase leg PL there is in this first embodiment of the invention a capacitor bank (here shown including two capacitors). The midpoint of this capacitor bank is here grounded.

It should here be realized that in some variations of the invention, the capacitor bank may be removed. The placing of the phase reactors can also be varied.

As mentioned earlier the converter can be based on a number of types of cells. Three such types will now be described.

Figure 3:
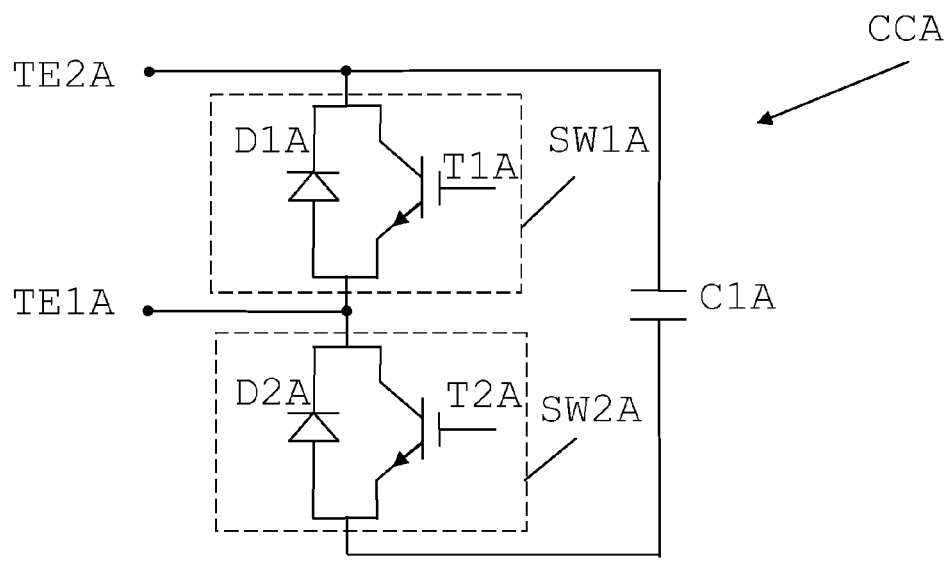

FIG. 3 schematically shows a first type of cell CCA. The cell CCA is a half-bridge converter cell and includes an energy storage element, here in the form of a capacitor C1A, which is connected in parallel with a first group of switching elements. The switching elements in the first group are connected in series with each other. The first group here includes two switching elements SW1A and SW2A (shown as dashed boxes), where each switching element SW1A, SW2A may be realized in the form of a switch that may be an IGBT (Insulated Gate Bipolar Transistor) transistor together with an anti-parallel diode or a number of series connected IGBTs together with a number of diodes in anti-parallel connection. In FIG. 3 there is therefore a first switching element SW1A having a first transistor T1A with a first diode D1A oriented upwards in the figure, which is towards the capacitor C1A, and connected in parallel between emitter and collector of the transistor T1A. There is also a second switching element SW2A connected in series with the first switching element SW1A and having a second diode D2A with the same orientation as the first diode D1A and connected in parallel between emitter and collector of a second transistor T2A.

The cell has a first cell connection terminal TE1A providing a connection between the phase leg and the connection point between the first and the second switching elements SW1A and SW2A. The cell also has a second cell connection terminal TE2A that provides a connection between the phase leg and the junction between the first switching element SW1A and the capacitor C1A. These cell connection terminals TE1A and TE2A thus provide points where the cell can be connected to the phase leg of the voltage source converter. The connection of the first cell connection terminal TE1A in the phase leg thus joins the phase leg with the connection point or junction between two of the series connected switching elements of the first group, here the first and second switching elements SW1A and SW2A, while the connection of the second cell connection terminal TE2A joins the phase leg with a connection point between the first group of series connected switching elements and the energy storage element, which is here the connection point between the first switching element SW1A and the first capacitor C1A. It can also be seen that the first switching element is connected between the first and the second cell connection terminals TE1A and TE2A. This means that when this switching element is turned on, the cell capacitor C1A will make no voltage contribution to the phase leg.

Figure 4:
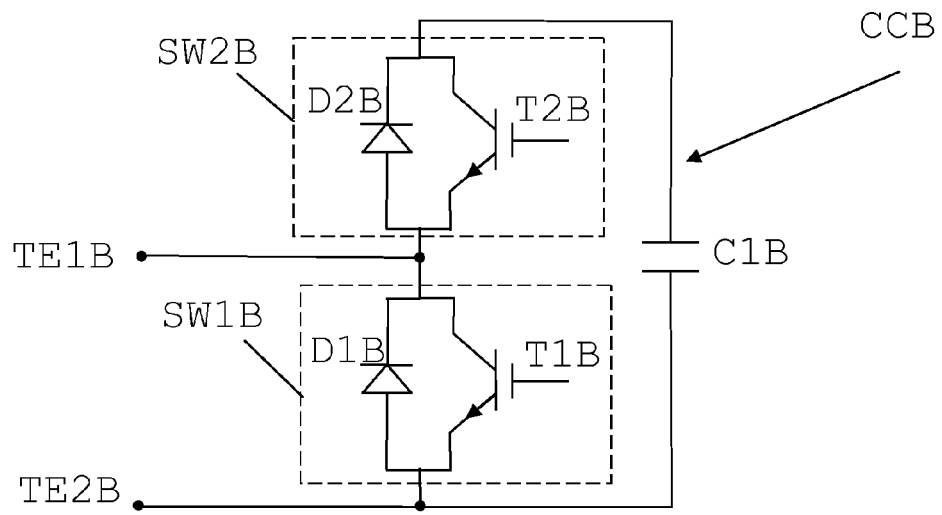

FIG. 4 shows a second type of cell that resembles the first type of cell. In this half-bridge cell there is, just as in the first type, a first group of switching elements including first switching element SW1B (shown as a dashed box) having a first transistor T1B and a first anti-parallel diode D1B in series with a second switching element SW2B (also shown as a dashed box) having a second transistor T2B with a second anti-parallel diode D2B. In parallel with this first group of switching elements there is a first energy storage element, also here in the form of a capacitor C1B, where the first switching element SW1B of this cell CCB according to this second type of cell has the opposite position in the branch compared with in the first type of cell. Consequently also the second switching element has the opposite position in the branch compared with the first type of cell.

Here the first cell connection terminal TE1B also provides a connection between the phase leg and the connection point between the first and the second switching elements SW1B and SW2B. The cell also has a second cell connection terminal TE2B that provides a connection between the first group of switching elements and the junction between the first switching element SW1B and the capacitor C1B and here at the junction between the first switching element SW1B and cell capacitor C1B. It can furthermore be seen that also here the first switching element is connected between the first and second the cell connection terminals TE1B and TE2B. This means that when this switching element is turned on, the cell capacitor C1B will make no voltage contribution to the phase leg.

Figure 5:
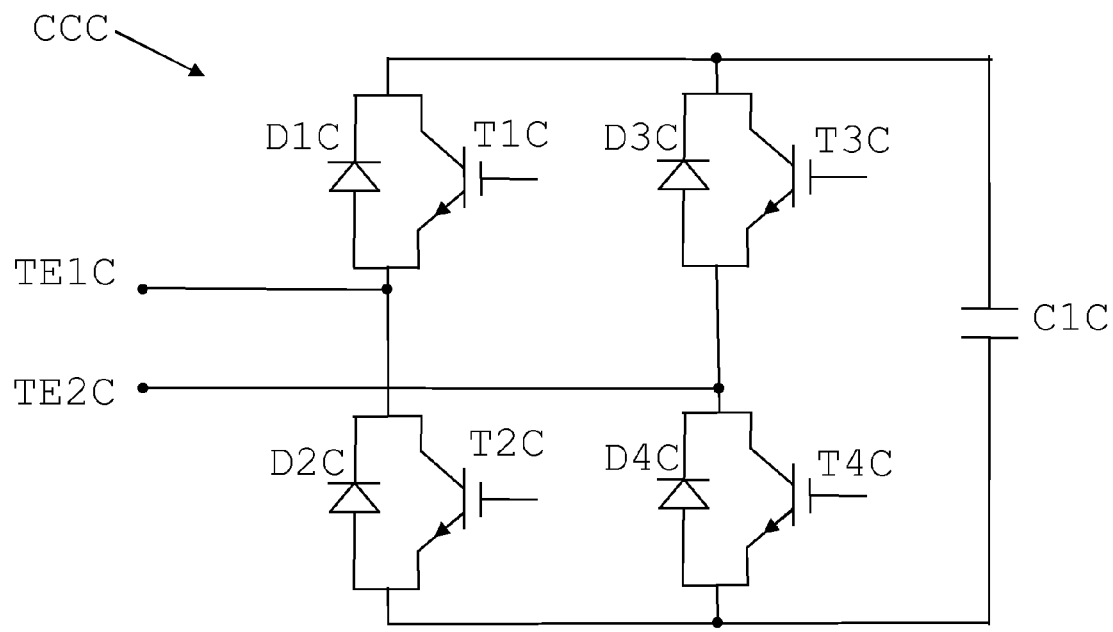

FIG. 5 schematically shows a converter cell CCC according to a third type including the same type of components having the same orientation as in the first type, i.e. a first and a second switching element each including a first and a second transistor T1C and T2C with anti-parallel first and second diodes D1C and D2C in a first group or branch provided in parallel with an energy storage element, also here realized as a capacitor C1C. These switching elements SW1C and SW2C in the first group are provided in the same way as in the first type of cell. However here there is a second group of switching elements connected in series with each other. This second group of switching elements is here connected in parallel with the first group as well as with the energy storage element. The second group here includes a third and a fourth switching element, provided through a third transistor T3C with anti-parallel third diode D3C and through a fourth transistor T4C with anti-parallel fourth diode D4C having the same orientation as the first and second diodes. This second group is thus provided in a further branch in parallel with the capacitor C1C. As before a first cell connection terminal TE1C here provides a connection between the phase leg and the junction between the first and the second switching elements. However the second connection terminal TE2C here also differs. In this third type of cell it provides a connection between the phase leg and a connection point between two of the series connected switching elements in the second group, and here this connection is provided via the junction between the third and fourth switching elements.

As opposed to the cells of the first and second types, this cell CCC is a full-bridge cell. It can also be seen that for this cell to provide a contribution to a phase leg, one switching element of each series-connection of switching elements has to be turned on, either the first and the forth switching element or the second and the third switching element. The switching elements can furthermore not be switched on in such a way that the same end of the cell capacitor is connected to both cell connection terminals. A switching element in one branch connected to one end of the cell capacitor has to be switched on together with a switching element in the other branch connected to the opposite end of the cell capacitor.

Figure 6:
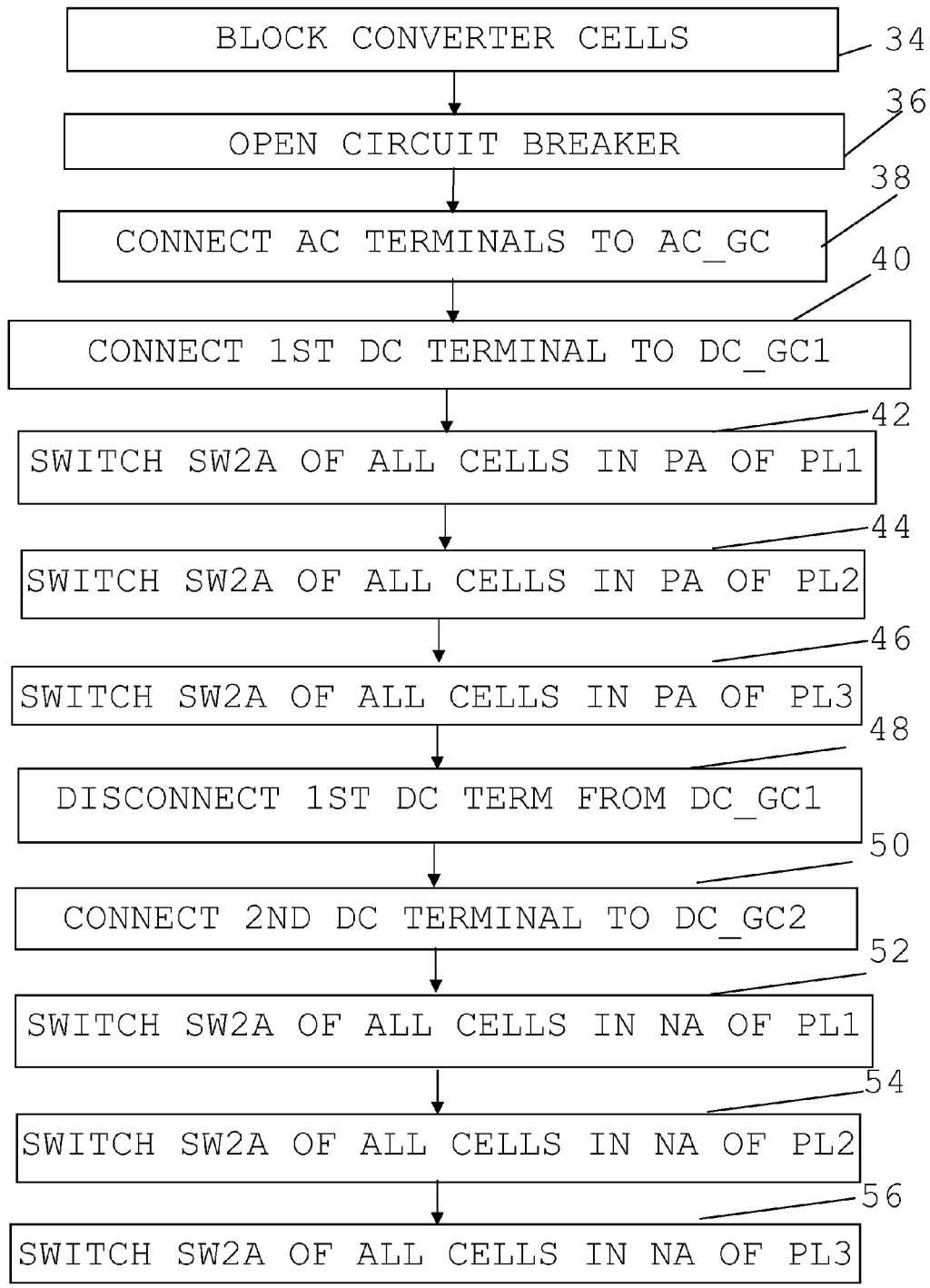
FIG. 6 shows a flow chart of a number of method steps in a method of discharging cell capacitors of a cell based voltage source converter according to the first embodiment of the invention, FIG. 7 schematically shows a first and a second selectable DC connection to ground used in an interface arrangement according to a second embodiment of the invention, FIG. 8 schematically shows a first and a second selectable DC connection to ground provided through a DC chopper circuit used in an interface arrangement according to a third embodiment of the invention, and FIG. 9 schematically shows a circuit breaker being used in an interface arrangement according to a fourth embodiment of the invention.

The functioning of the interface arrangement according to a first embodiment of the invention will now be described with reference being made to FIGS. 1, 2 and 6, where the latter shows a flow chart of a number of method steps in a method of discharging cell capacitors of a cell based voltage source converter according to the first embodiment of the invention.

The converter of the interface arrangement may need to be shut down in various situations. It may need to be shut down for service and/or maintenance. However, it may also need to be shut down in order to perform a protective action in case of faults. As a part of this shutting down, the switching elements of the cells are blocked, which involves turning off the transistors of the switching elements. The charge can be dangerous to service personnel and in order to allow fast repair/maintenance they need to be discharged fast. Without any special discharging measures being made, the voltage of the cell capacitors will only be discharged via very high internal impedances such as through a voltage divider. Normally, this may therefore take at least half an hour to discharge this voltage. The invention is directed towards improving on this situation.

The method therefore starts by the need to shut down the converter. What happens first is therefore that the control unit 30 blocks all the converter cells through turning off all the switching elements, i.e. all the transistors, step 34. Thereafter the control unit 30 opens the circuit breaker 32, step 36, for disconnecting the interface arrangement from the AC system S1. It is here also possible that the DC terminals 12 and 14 of the interface arrangement 16 are disconnected from the DC system S2 via corresponding circuit breakers. After such system disconnection has been performed the control unit 30 continues and connects the AC terminal 22 of the converter 20 to the AC connection to ground AC_GC through closing AC ground switch 24, step 38, and thereafter connects the first DC terminal 12 to the first DC connection to ground DC_GC1 through closing the first DC ground switch 26, step 40. In this way the control unit 30 has formed a first capacitor discharging circuit. This circuit is made up of the first AC connection to ground AC_GC, the positive arms of the phase legs of the converter 20 and the first DC connection to ground DC_GC1.

This means that the cells of the positive arms are placed in parallel with the common discharge resistor R, which enables their discharging. Each positive arm is furthermore placed in parallel with the resistor R.

Thereafter the second switching elements SW2A in the positive arm PA of a first phase leg PL1 are turned on, step 42. They are in this example furthermore turned on simultaneously, i.e. at the same time. This means that when the cell is a half-bridge cell then the switching element having a single connection to a cell connection terminal TE1A or TE2A is turned on. The same is the case in the cell of the second type. The switching element having two connections to a cell connection terminal, i.e. being connected between the two cell connection terminals, is however not turned on. In the case of full-bridge cell, then the switching elements with opposite positions in the branches are turned on. This switching is performed in order to ensure that the cell capacitors are connected in series between the AC and DC terminals in the discharging circuit. This means that the control unit only switches on the switching elements of the positive arm of the first phase leg that cause the connection of the cell capacitors into the discharging circuit in order to discharge these cell capacitors. The turn-on pulse can here be in the range of 80-95 ms in width.

When this has been done, the switching on is sequentially repeated for the other phase legs. There may be a short pause, for instance 50 ms, between the switching on pulses of each phase leg. This means that 50 ms after the end of switching on of the switching elements of the positive arm of one phase leg, the switching elements of the positive arm of a next phase leg may be switched on.

This means that 50 ms after the switching elements in the cells of the positive arm of the first phase leg have been turned off, the switching elements SW2A of all cells in the positive arm of a second phase leg may be simultaneously switched on, step 44, where the period of time during which they are switched on may also be 80-95 ms.

50 ms after the switching elements in the cells of the positive arm of the second phase leg have been switched off, the switching elements SW2A of all cells in the positive arm of a third phase leg are simultaneously switched on, step 46, where the period of time when they are switched on may also here be 80-95 ms.

As all the cells of all positive arms have been discharged, the cells of the negative arms will now have to be discharged.

Therefore, the control unit 30 now disconnects the first DC terminal 12 from the first DC connection to ground DC_GC1, step 48. This is done through turning off the first DC ground switch 26. Thereafter the control unit 30 connects the second DC terminal 14 to the second DC connection to ground DC_GC2, step 50. This is done through closing the second DC ground switch 28, while keeping the AC ground switch 24 closed. In this way there is formed a second capacitor discharging circuit. This circuit is made up of the first AC connection to ground AC_GC, the negative arms NA of the phase legs of the converter 20 and the second DC connection to ground DC_GC2. Also here the cells are placed in parallel with the common discharge resistor R, which enables their discharging. The negative arms are thus all placed in parallel with the common discharge resistor R.

Thereafter the cell capacitors of the negative arm of the first phase leg are discharged, which may also as an example take place 50 ms after the end of discharge of the cell capacitors in the positive arm of the third phase leg. This means that now the second switching elements SW2A of all cells in the negative arm of the first phase leg are simultaneously switched on, for instance during 80-95 ms, by the control unit 30, step 52.

This step of turning on switching elements is then repeated for the second and third phase legs in the same way as for the positive arm. This means that the switching elements SW2A of all cells in the negative arm of a second phase leg are simultaneously switched on, step 54, which may also be 80-95 ms, followed at an exemplifying time of 50 ms later by the switching elements in the cells of the negative arm of the third phase leg being simultaneously switched on, step 56, which duration of switching on may also be 80-95 ms.

In this way the cell capacitors are discharged fast and in the example above in less than a second. The ground switches are normally needed for other purposes, why this discharging is furthermore provided through only providing one additional discharge resistor. As the resistor is only connected when the converter is taken out of operation, this way of discharging does not cause any additional losses.

Figure 7:
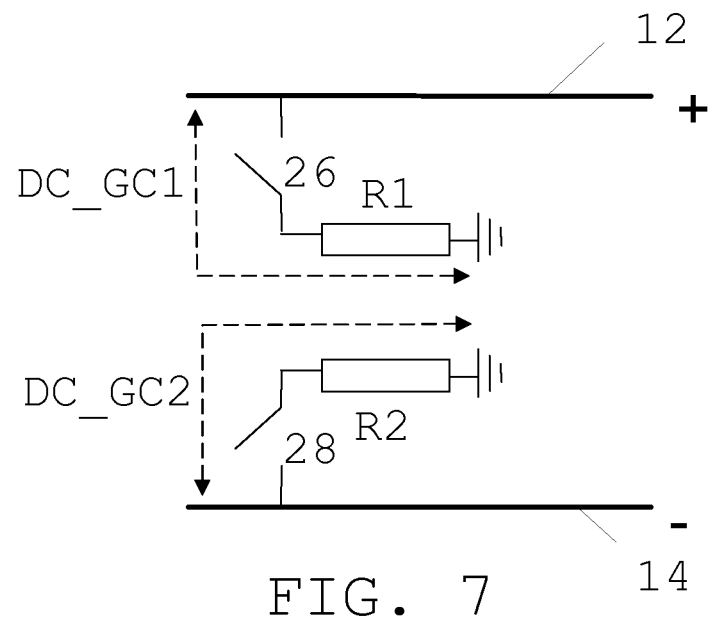

If it is important to speed up the discharge, it is possible to provide more discharge resistors, one in each DC connection to ground. Two DC pole earth switching branches provided for this purpose in an interface arrangement according to a second embodiment of the invention are schematically shown in FIG. 7. Here each DC connection to ground includes its own discharge resistor.

In this second embodiment of the invention the first DC connection to ground DC_GC1 includes the first DC ground switch 26 in series with a first resistor R1, while the second DC connection to ground DC_GC2 includes the second DC ground switch 28 in series with a second resistor R2. The DC connections to ground are thus completely separate.

Figure 8:
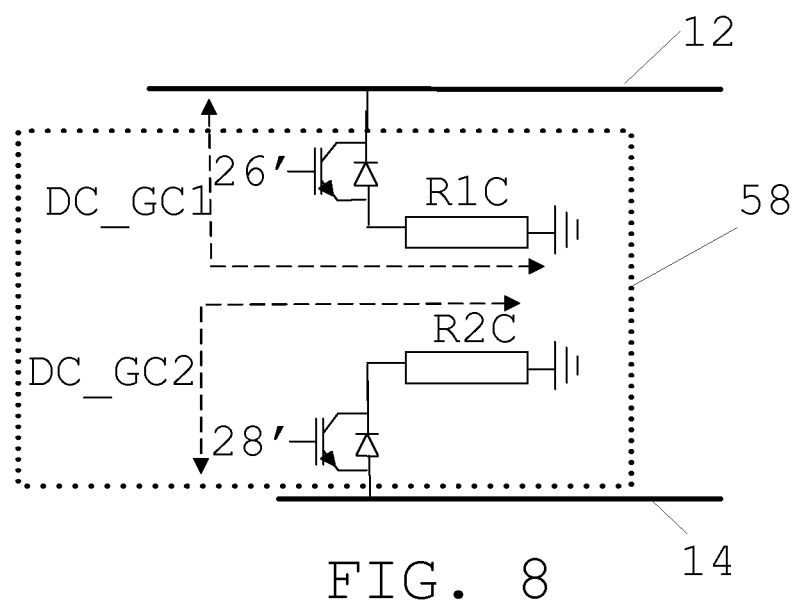

In some converter applications, such as in relation to wind farms, the converter may need to be provided with a DC chopper circuit. When such a DC chopper circuit is provided, it may with advantage be used for providing DC connections to ground. A DC chopper circuit used for providing a first and a second DC connection to ground DC_GC1 and DC_GC2 in an interface arrangement according to a third embodiment of the invention is schematically shown in FIG. 8. The DC chopper circuit 58 is here connected between the two poles of the DC system S2 instead of the first and second DC connections to ground DC_GC1 and DC_GC2. Such a DC chopper circuit 58 includes two semiconductor switches 26' and 28', each connected to a corresponding pole and joined to a corresponding resistor R1C and R2C leading to ground in essentially the same way as in the second embodiment. This means that the chopper circuit 58 provides the separate connections to ground for the DC terminals.

The discharging of the cell capacitors in the interface arrangement according to the second and third embodiment can here be performed in the same way as in the first embodiment, i.e. that the first DC connection to ground DC_GC1 is first connected to the first pole for discharging the cells of the positive arms, which is then followed by the connection of the second DC connection to ground DC_GC2 to the second pole, and then discharging of the cells in the negative arms. However, it is here also possible that the cell capacitors of the positive and negative arms are discharged at the same time. This means that in the second and third embodiments it is possible that the first and the second poles are connected to the two DC connections to ground DC_GC1 and DC_GC2 simultaneously and then the capacitors of all cells of a phase leg are discharged simultaneously, which discharging is performed sequentially for the phase legs. This increases the speed of discharging so that it is halved in comparison with the first embodiment. In the second embodiment this increased speed is obtained through providing two discharge resistor, while in the third embodiment this increased speed is obtained at no additional cost if a DC chopper circuit is already provided for other purposes.

It should be realized that discharge resistors need not be provided on the DC side. They can be provided on the AC side, for instance in an AC connection to ground, which may thus be common for all AC terminals of the converter. This means that either each AC connection to ground or a corresponding DC connection to ground has to include a resistor for forming a capacitor discharging circuit.

As such a resistor it is also possible to use a bypass resistor which is often provided in a circuit breaker.

Figure 9:
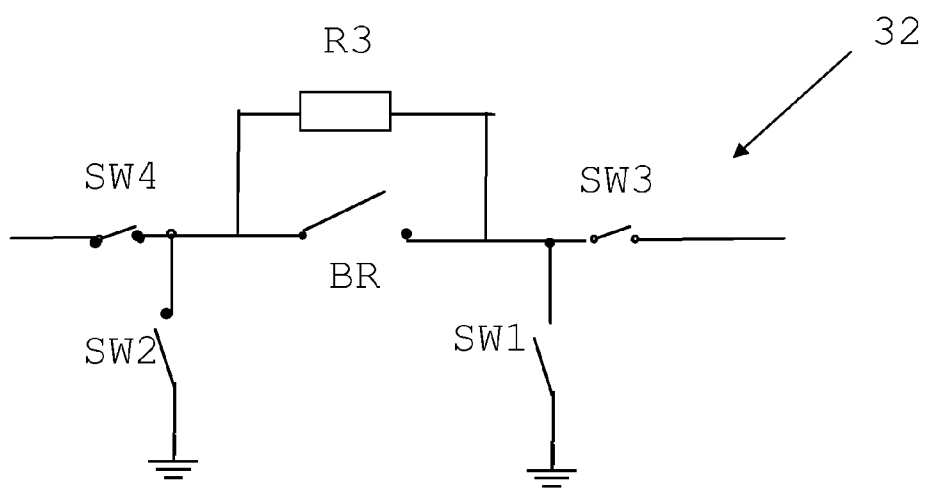

FIG. 9 schematically shows a circuit breaker 32 being used in an interface arrangement according to a fourth embodiment of the invention. The circuit breaker 32 here includes a breaker element BR provided in series between an AC system and the transformer. A first end of the breaker element is here connected to ground via a first switch SW1 and a second end of the breaker element BR is connected to ground via a second switch SW2. The first end of the breaker element BR is then connected to the transformer (not shown) via a third switch SW3, while the second end of the breaker element BR is connected to the AC system (not shown) via a fourth switch SW4. There is finally a third resistor R3 connected in parallel with the breaker element BR. In normal operation the breaker element BR and the third and fourth switches SW3 and SW4 are closed, while the first and second switches SW1 and SW2 are open. After the breaker element BR has been opened in order to separate the interface arrangement from the AC system, the control unit in this embodiment first opens the fourth switch SW4 and then closes the second and third switches SW2 and SW3, while keeping the first switch SW1 open. In this way it is possible to provide an AC connection to ground using the resistor of a circuit breaker, which also provides the possibility of providing the invention at no additional cost if this type of circuit breaker is already provided.

There are a number of variations that are possible to be made of the present invention apart from the variations already mentioned.

It should first of all be mentioned that the cell capacitors of a phase arm need not all be discharged simultaneously. They may be discharged in groups. The cells of a phase leg in a formed capacitor discharging circuit can therefore be grouped into groups. In the method steps described above there was only one such group for each phase arm. In alternative versions of the invention there are at least two groups of cells for each phase arm.

A group may here for instance include 25, 33% or 50% of the cells of an arm. There may thus be two, three or four groups in a phase arm and the cells of a group are switched on and discharged simultaneously followed by the simultaneous switching on and discharging of a following group. The discharge current of the capacitors from the cells of one group will then flow through the anti-parallel diodes of the cells in the other groups, since the switching elements of the cells in these other groups are blocked during the discharging. This alternative way of discharging does somewhat slow down the discharging process as compared with the previously described variations of the invention, but it is still faster than the known discharging techniques. This way of discharging has the further advantage of avoiding very high DC pole voltages, such as twice the rated DC pole voltage, at the beginning of the discharging process.

It should also be realized that it is possible to omit reactors from phase legs. The reactors in the phase legs may also have other positions than the ones shown.

The semiconductor elements used in the cells have been described as IGBTs. It should be realized that other types of semiconductor elements may be used, such as thyristors, MOSFET transistors, GTOs (Gate Turn-Off Thyristor) and mercury arc valves. The number of cells of different types and their orientations may furthermore be varied in a multitude of ways depending on the desired functionality and voltage levels.

The control unit may be realized in the form of a processor with accompanying program memory comprising computer program code that performs the desired control functionality when being run on the processor.

From the foregoing discussion it is evident that the present invention can be varied in a multitude of ways. It shall consequently be realized that the present invention is only to be limited by the following claims.

The invention claimed is:

1. A method of discharging cell capacitors of a cell based voltage source converter having a set of AC terminals and a set of DC terminals,
where
said AC terminals each have a selectable AC connection to ground,
each DC terminal has a corresponding selectable DC connection to ground,
the cells are connected in cascade in a set of parallel phase legs between the DC terminals,
an AC terminal is provided at a midpoint of a phase leg, thereby dividing the phase leg into two phase arms, and
each cell has at least one branch with series connected switching elements in parallel with a capacitor,
the method comprising the steps of:
blocking all the cells of the converter, connecting the AC terminals to the corresponding AC connections to ground,
connecting a first DC terminal to a first DC connection to ground, where either each AC connection to ground or said first DC connection to ground includes a resistor for forming a first capacitor discharging circuit, said first capacitor discharging circuit also comprising the phase arms between the AC terminals and the first DC terminal, thereby placing the cells of these phase arms in parallel with the resistor, wherein the cells of a phase arm in a formed capacitor discharging circuit are grouped into at least one group,
simultaneously switching on, in all cells of a group of cells in a phase arm of a first phase leg, the switching elements to configure corresponding cell capacitors to be connected in series between the AC and DC terminals for discharging the cell capacitors in said phase arm, and
sequentially repeating the step of switching on for the cells of the other phase arms of the capacitor discharging circuit until all cell capacitors in the formed capacitor discharging circuit have been discharged.

2. A method according to claim 1, further comprising the step of disconnecting the AC terminals from an AC system.

3. A method according to claim 1, wherein there is one group of cells in each phase arm in a capacitor discharging circuit.

4. A method according to claim 1, wherein there are at least two groups of cells in each phase arm in a capacitor discharging circuit.

5. A method according to claim 1, further comprising the step of connecting a second DC terminal to a second DC connection to ground, where either each AC connection to ground or the second DC connection to ground comprises a resistor for forming a second capacitor discharging circuit, said second capacitor discharging circuit also comprising the phase arms between the AC terminals and the second DC terminal, and performing the simultaneous switching on of cells in a phase arm of the first phase leg and sequentially repeating switching on of cells in phase arms of the other phase legs in the formed second capacitor discharging circuit.

6. A method according to claim 5, wherein the second capacitor discharging circuit is formed after the cell capacitors of the first capacitor discharging circuit have been discharged.

7. A method according to claim 6, further comprising the step of disconnecting the first DC terminal from the first DC connection to ground before the second DC terminal is connected to the second DC connection to ground.

8. A method according to claim 5, wherein the second capacitor discharging circuit is formed simultaneously with the forming of the first capacitor discharging circuit and the steps of simultaneously switching on for the first phase leg and sequentially repeating switching on for the other phase legs are performed at the same time for the first and the second capacitor discharging circuits.

9. A method according to claim 1 wherein each DC connection to ground includes a separate resistor.

10. A method according to claim 9, wherein the DC connections to ground provided for the DC terminals are provided through a chopper circuit.

11. A method according to claim 1, wherein the DC connections to ground are provided through DC pole earth switching branches.

12. A method according to claim 1, wherein each AC connection to ground comprises a resistor.

13. A method according to claim 12, wherein the resistor is provided via a bypass branch of a circuit breaker.

14. A cell capacitor discharging arrangement for coupling between an AC system and a DC system and comprising
a cell based voltage source converter for conversion between AC and DC, said converter having a set of AC terminals and a set of DC terminals, a number of cells connected in cascade in a set of parallel phase legs between the DC terminals, where an AC terminal is provided at a midpoint of a phase leg, thereby dividing the phase leg into two phase arms, and each cell has at least one branch with series connected switching elements in parallel with a capacitor,
wherein said AC terminals each have a selectable AC connection to ground and each DC terminal has a corresponding selectable connection to ground, and
a control unit configured to
block all the cells of the converter,
connect the AC terminals to the corresponding AC connections to ground,
connect a first DC terminal to a first DC connection to ground, where either each AC connection to ground or said first DC connection to ground includes a resistor for forming a first capacitor discharging circuit, said first capacitor discharging circuit also comprising the phase arms between the AC terminals and the first DC terminal, thereby placing the cells of these phase arms in parallel with the resistor, where the cells of a phase arm in a formed capacitor discharging circuit are grouped into at least one group, and
simultaneously switch on, in all cells of a group of cells in a phase arm of a first phase leg, the switching elements to configure corresponding cell capacitors to be connected in series between the AC and DC terminals for discharging the cell capacitors in said phase arm, and sequentially repeat switching on for the cells of the other phase arms of the capacitor discharging circuit until all cell capacitors in the formed capacitor discharging circuit have been discharged.

15. The cell capacitor discharging arrangement according to claim 14, wherein the control unit is further configured to disconnect the AC terminals from an AC system.

16. The cell capacitor discharging arrangement according to claim 14, wherein there is one group of cells in each phase arm in a capacitor discharging circuit.

17. The cell capacitor discharging arrangement according to claim 14, wherein there are at least two groups of cells in each phase arm in a capacitor discharging circuit.

18. The cell capacitor discharging arrangement according to claim 14, wherein the control unit is further configured to connect a second DC terminal to a second DC connection to ground, where either each AC connection to ground or the second DC connection to ground comprises a resistor for forming a second capacitor discharging circuit, the second capacitor discharging circuit also comprising the phase arms between the AC terminals and the first DC terminal, and performing the simultaneous switching on for cells in a phase arm of the first phase leg and sequentially repeating of switching on of cells in phase arms of the other phase legs in the formed second capacitor discharging circuit.

19. The cell capacitor discharging arrangement according to claim 18, wherein the second capacitor discharging circuit is formed after the cell capacitors of the first capacitor discharging circuit have been discharged.

20. The cell capacitor dischargingarrangement according to claim 19, wherein the control unit is further configured to disconnect the first DC terminal from the first DC connection to ground before the second DC terminal is connected to the second DC connection to ground.

21. The cell capacitor dischargingarrangement according to claim 18, wherein the second capacitor discharging circuit is formed simultaneously with the forming of the first capacitor discharging circuit and the control unit is further configured to simultaneously perform switching on for the phase arm of the first phase leg and sequentially repeat switching on for the phase arms of the other phase legs at the same time for the first and the second capacitor discharging circuits.

22. The cell capacitor discharging arrangement according to claim 14, wherein each DC connection to ground includes a resistor.

23. The new cell capacitor discharging arrangement according to claim 22, further comprising a chopper circuit providing connections to ground for the DC terminals.

24. The cell capacitor discharging arrangement according to claim 14, further comprising pole earth switching branches providing the DC connections to ground.

25. The cell capacitor discharging arrangement according to claim 14, wherein each AC connection to ground comprises a resistor.

26. The cell capacitor discharging arrangement according to claim 14, wherein the resistor is provided via a bypass branch of a circuit breaker.

* * * * *